Patented June 17, 1930

1,764,035

UNITED STATES PATENT OFFICE

SAMUEL LEWIS SUMMERS, OF FORT WASHINGTON, PENNSYLVANIA

METHYLENE-DISALICYLIC-ACID DERIVATIVE

No Drawing. Application filed July 5, 1928. Serial No. 290,709.

My invention relates to organic compounds and their manufacture, and is especially concerned with a novel methylene-disalicyl amide diacetate or methylene-diacetyl-disalicyl amide, and its homologues such as hereinafter indicated. These substances (especially the particular one named) are useful for pharmaceutical purposes, as hereinafter indicated.

My product may be prepared as follows:

Starting with methylene-disalicylic acid, the first step is esterification. Various homologous esters may be produced in the manner hereinafter described,—by using the corresponding methyl, ethyl, propyl or other alcohols,—with a corresponding difference in the esterification product. A way of carrying out the esterification with ethyl alcohol is as follows:

Dissolve 288 lbs. of methylene-disalicylic acid in 150 lbs. of ethyl alcohol, and slowly add to the solution, at a temperature of 70° C., a solution of 60 lbs 66° Bé. sulphuric acid diluted with 40 lbs. water. When this has all been added, raise the temperature to 150° C. under a reflux condenser, and hold at this temperature for about 2 hours. The essential product is the ester, methylene-diethyl-disalicylate:

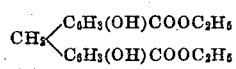

The next main step is to convert this ester to an amide, which may be done as follows:

Dissolve the ester in strong aqueous ammonia ("concentrated", or 28% $NH_3$), and heat the solution under pressure (in an autoclave), maintaining it at a temperature of 110° C. for eight hours. The essential product is methylene-disalicyl amide, having the formula:

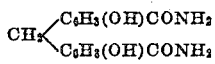

The next main step is to acetylate this amide, which may be done as follows:

This product, obtained as above described (or an equal amount prepared in any other suitable way), is heated with a solution of 210 lbs. of acetic anhydride dissolved in 100 lbs. of acetic acid. This heating is carried out under a reflux condenser, and is continued for four hours. The essential product is my novel methylene-disalicyl amide diacetate or methylene-diacetyl-disalicyl amide having the empirical formula $C_{19}H_{18}N_2O_6$, and the structural formula:

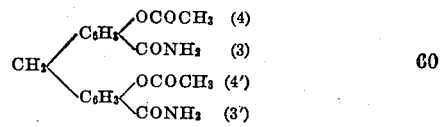

It is a crystalline substance, insoluble in water and substantially tasteless, but soluble in alcohol and ether. It has valuable pharmaceutical properties, being useful as anti-neuralgic, anti-rheumatic and anti-arithritic. It is to be taken internally, the dosage being from 45 to 120 grains a day.

Having thus described my invention, I claim:

1. The hereindescribed methylene-diacetyl-disalicyl amide; insoluble in water and substantially tasteless, but soluble in alcohol and ether; and typified by the empirical formula $C_{19}H_{18}N_2O_6$.

2. The hereindescribed methylene-diacetyl-disalicyl amide; insoluble in water and substantially tasteless, but soluble in alcohol and ether; and having the formula

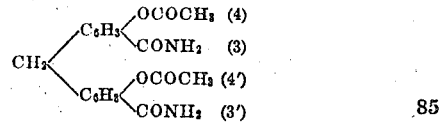

In testimony whereof, I have hereunto signed my name at Philadelphia, Pennsylvania, this 29th day of June, 1928.

SAMUEL LEWIS SUMMERS.